(12) United States Patent
Geisen et al.

(10) Patent No.: US 12,345,307 B2
(45) Date of Patent: Jul. 1, 2025

(54) BUSH

(71) Applicant: DTR VMS Limited, Trowbridge (GB)

(72) Inventors: Jan Geisen, Mendig (DE); Jonathan Morton, Andernach (DE); Christian Stanka, Montabaur (DE); Michael Lines, Andernach (DE); Werner Kaiser, Ruppach-Goldhausen (DE); SeonDoSeong Cho, Busan (KR)

(73) Assignee: DN Automotive Germany GmbH (DE)

( * ) Notice: Subject to any disclaimer, the term of this patent is extended or adjusted under 35 U.S.C. 154(b) by 242 days.

(21) Appl. No.: 17/281,526

(22) PCT Filed: Sep. 30, 2019

(86) PCT No.: PCT/EP2019/076458
§ 371 (c)(1),
(2) Date: Mar. 30, 2021

(87) PCT Pub. No.: WO2020/070069
PCT Pub. Date: Apr. 9, 2020

(65) Prior Publication Data
US 2022/0042567 A1  Feb. 10, 2022

(30) Foreign Application Priority Data

Oct. 1, 2018 (GB) .................................. 1815999

(51) Int. Cl.
*F16F 1/38* (2006.01)
*F16F 7/108* (2006.01)
(52) U.S. Cl.
CPC ................ *F16F 1/38* (2013.01); *F16F 7/108* (2013.01)

(58) Field of Classification Search
CPC .................................... F16F 1/38; F16F 7/108
See application file for complete search history.

(56) References Cited

U.S. PATENT DOCUMENTS 3,787,102 A * 1/1974 Moran ...................... F16F 1/38
267/282
5,873,565 A   2/1999 Allaire
(Continued)

FOREIGN PATENT DOCUMENTS

DE   102008019121 A1   1/2009
DE   102011053015 A1 * 2/2013 .............. F16F 1/373
(Continued)

OTHER PUBLICATIONS

Kevin Hewitt, British Patent Office, Search Report re Corresponding Application No. GB11815999.6, Mar. 12, 2019, 3 pages, South Wales.
(Continued)

*Primary Examiner* — Xuan Lan Nguyen
(74) *Attorney, Agent, or Firm* — McGarry Bair PC (57) ABSTRACT

A tuning element that can be integrally formed with a resilient body of a bush and configured to reduce dynamic stiffness increases associated with eigenmodes of the resilient body within a predetermined operational vibration frequency range. The tuning element may resemble an upstanding wall or wing on an outer surface of the resilient body. The resilient body may comprise a plurality of radial arms having axial passageways therebetween. The tuning element may bridge the passageways. A bush configured in this way may be particular suitable for use in scenario where the operational vibration frequency range comprises high frequency, such as an engine mount for an electric vehicle.

18 Claims, 7 Drawing Sheets

(56) References Cited

U.S. PATENT DOCUMENTS

| | | | |
|---|---|---|---|
| 2008/0258364 A1 | 10/2008 | Hirano et al. | |
| 2012/0248285 A1* | 10/2012 | Mitsch | F16F 1/187 |
| | | | 248/316.6 |
| 2013/0287330 A1 | 10/2013 | Ikeda | |
| 2016/0208879 A1* | 7/2016 | Conrad | F16F 1/38 |
| 2018/0354330 A1* | 12/2018 | Babu | F16F 1/3828 |
| 2019/0264739 A1 | 8/2019 | Dürre et al. | |

FOREIGN PATENT DOCUMENTS

| | | | |
|---|---|---|---|
| DE | 102016118157 A1 | 3/2018 | |
| EP | 131795 A * | 1/1985 | B60G 99/00 |
| EP | 0750131 B1 | 2/2000 | |
| WO | 2006024426 A2 | 3/2006 | |
| WO | 2014131004 A1 | 8/2014 | |
| WO | 2018054620 A1 | 3/2018 | |

OTHER PUBLICATIONS

Jochen Werth, European Patent Office, International Search Report re Corresponding Application No. PCT/EP2019/076458, Sep. 30, 2019, 3 pages.

Chinese Patent Office, Office Action re Corresponding Application No. 201980064922.X, Mar. 8, 2022, 9 pages, China.

* cited by examiner

BUSH

CROSS-REFERENCE TO RELATED APPLICATIONS

This application is a National Phase application of International Application No. PCT/EP2019/076458, filed Sep. 30, 2019, which claims the benefit of British Application GB 1815999.6, filed on Oct. 1, 2018, both of which are incorporated herein in their entireties.

FIELD OF THE INVENTION

The invention relates to a bush for resisting vibrations between two components, such as the engine and chassis of a vehicle.

BACKGROUND TO THE INVENTION

Typically a bush for resisting vibration comprises two anchor parts that are connected by resilient material, such as rubber. One anchor part is attached to one component of the vibrating machinery, and the other anchor part attached to another component. As the two components vibrate relative to each other, the resilient material to provide isolation between vibrating component and anchor. Such bushes thus permit some relative movement, but act to prevent excessive movement between components.

GB 2 364 558 discloses an example of a bush, in which the anchor part for one component of the vibrating machinery is in the form of a hollow sleeve and the other anchor part in the form of a rod or tube extending approximately centrally and coaxially of the sleeve. A resilient body, e.g. of rubber or other suitable elastomeric material, is disposed within an annular volume between the sleeve and the rod. The resilient body can be secured in place, e.g. by radial crimping of the sleeve towards the rod.

The resilient body between the sleeve and the rod represents a spring element for isolating vibration. The dynamic stiffness of this spring element varies with vibration frequency depending on a number of factors, including the resilient material used, and the shape and configuration of the connection between the sleeve and rod. However, in any given arrangement, the resilient body will exhibit one or more eigenmodes where the dynamic stiffness increases and the vibrational isolation between the interconnected components is reduced.

It is desirable for dynamic stiffness increases due to eigenmodes of the resilient body to be reduced within a frequency range associated with normal operation of the two components to be interconnected (e.g. engine and chassis in a vehicle).

SUMMARY OF THE INVENTION

At its most general, the present invention provides a tuning element that can be integrally formed with a resilient body of a bush and configured to reduce dynamic stiffness increases associated with eigenmodes of the resilient body within a predetermined operational vibration frequency range. The tuning element may resemble an upstanding wall or wing on an outer surface of the resilient body. A bush configured in this way may be particular suitable for use in scenario where the operational vibration frequency range comprises high frequency, such as an engine mount for an electric vehicle. The predetermined operational frequency range may be a sensitive vibration frequency range, e.g. associated with vibration frequency that may be expected to occur regularly or for extended periods during operation. For example, where the bush is connected in a vehicle, the predetermined operation vibration frequency range may be associated with motor vibrations associated with cruising across a range of conventional speeds.

According to the present invention, there may be provided a bush for isolating vibrations, the bush comprising: a first anchor part that defines a longitudinal axis; a second anchor part spaced from the first anchor part; a resilient body extending between the first anchor part and the second anchor part and operably engaged with the first anchor part and the second anchor part to isolate vibrations therebetween; and a tuning element operably coupled to an outer surface of the resilient body, wherein the tuning element comprises an upstanding wall on the outer surface of the resilient body, and wherein the tuning element is configured to reduce dynamic stiffness increases associated with eigenmodes of the resilient body within a predetermined operational vibration frequency range. The tuning element preferably comprises an annular wall or wing that encircles the longitudinal axis and protrudes from the outer surface of the resilient body.

The term "resilient" is used herein to indicate generally the ability to recoil or spring back, e.g. in an elastic manner, after application of a deforming force.

The tuning element may be integrally formed with the resilient body. In other words both the resilient body and the tuning element may be made from the same resilient deformable material, e.g. natural rubber or the like. However, in other examples, the tuning element may be a separate entity that is bonded or otherwise secured to the resilient body.

The tuning element may comprise a plurality of annular walls. Each annular wall may be coaxial with the longitudinal axis.

The outer surface of the resilient body may be any exposed surface of the resilient body from which the tuning element can extend without interfering with operation of the bush. For example, the tuning elements may comprises protrusions on axially-facing surfaces or radially-facing surfaces of the resilient body. As mentioned above, the tuning element may comprise annular elements, e.g. in the form or a wall or wing that projects from a surface of the resilient body. The annular wall or wing may project in any direction relative to the longitudinal axis. For example, it may extend in a direction parallel or normal to the longitudinal axis. Or it may be angled relative to the longitudinal axis.

In one embodiment, the second anchor part may be disposed coaxially with respect to the first anchor part. The resilient body may thus extend radially between the first anchor part and the second anchor part. In this example, the upstanding wall may be on an axial end surface of the resilient body. The upstanding wall may be an annular wall having a height extending in the axial direction. For example, the tuning element may comprise an upper annular wall protruding from an upper axial end surface of the resilient body, and a lower annular wall protruding from a lower axial end surface of the resilient body. In some examples there may be multiple annular walls on one or both axial end surfaces.

Each annular wall may have a maximum radial thickness that is less than half, preferably less than a third or a quarter, of the radial length of the axial end surface. Each annular wall may have a substantially uniform radial thickness along its axial length.

The resilient body may comprise a plurality of radial arms spaced apart around the longitudinal axis, and wherein each pair of adjacent arms are separated by a longitudinally extending passageway. The upstanding wall may be formed only on the radial arms, i.e. it may extend in separate discrete element around the longitudinal axis. Preferably, however, the upstanding wall bridges across each longitudinally extending passageway so that it encircles the longitudinal axis in a continuous manner.

In one example, the first anchor part may be a rod extending along the longitudinal axis. The second anchor part may comprise a sleeve surrounding the rod and defining an annular space therebetween. The resilient body may extend radially between an outer surface of the rod and an inner surface of the sleeve. The resilient body may be a solid resilient member that fills the annular volume between the rod and the sleeve, or may be a moulded resilient member having passages or cavities therein to facilitate relative movement between the first anchor part and the second anchor part during vibration.

The resilient body may comprise an upper lobe that extends radially between the first anchor part and second anchor part and a lower lobe that extends radially between the first anchor part and second anchor part. The upper lobe and lower lobe may be separated by an annular space. The upper axial end surface may be on the upper lobe and the lower axial end surface may be on the lower lobe.

The resilient body may comprise a snub portion in the annular space. The snub portion may be configured to limit radial travel of the first anchor part relative to the second anchor part.

Preferably the resilient body is formed by injection moulding.

Preferably the first anchor part is connectable to a first machine component and the second anchor part is connectable to a second machine component, whereby the bush is operable to isolate vibrations between the first machine component and second machine component. For example, the first machine component may be an electric motor. Alternatively, the first machine component and the second machine component are the engine and chassis of a vehicle.

BRIEF DESCRIPTION OF THE DRAWINGS

Embodiments of the invention are described in detail below with reference to the accompanying drawings, in which.

DETAILED DESCRIPTION; FURTHER OPTIONS AND PREFERENCES

Figure 1:
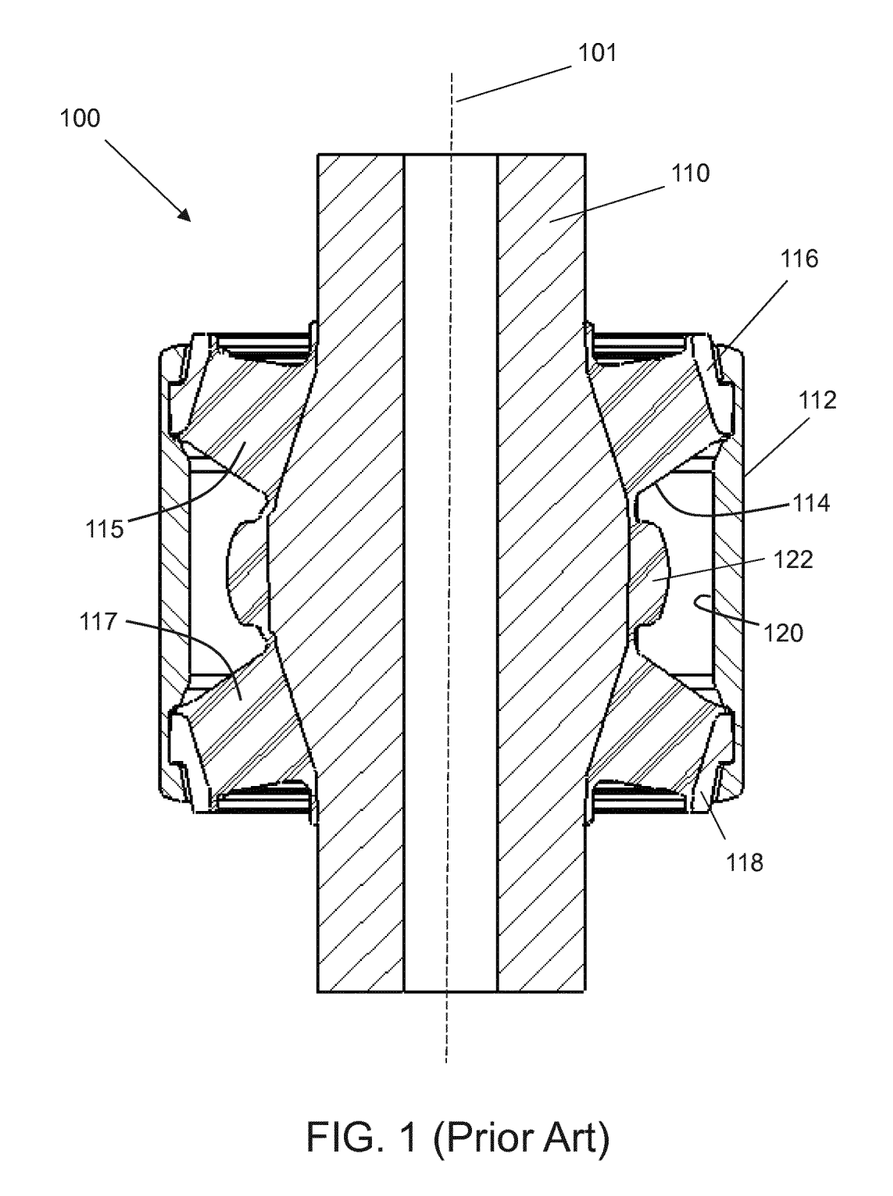
FIG. 1 is a cross-sectional side view of a known type of bush.

FIG. 1 is a cross-sectional view of a known type of bush 100 that is described here to facilitate understanding of the invention. The bush 100 has a generally cylindrical configuration that exhibits rotation symmetry about a longitudinal axis. The cross-sectional side view shown in FIG. 1 is taken parallel to the longitudinal axis 101.

The bush 100 comprises a first anchor part 110 and a second anchor part 112. The second anchor part 112 is spaced from the first anchor part 110 by a resilient body 114 which extends between them.

The first anchor part 110 comprises a rigid rod, which may be a hollow tube, made from any suitable material, e.g. a metal such as aluminium or steel. In some embodiments, the first anchor part 110 may be formed of two or more components. For example, the first anchor part 110 may have a core component, such as a hollow metal tube, surround by an annular plastic component (e.g. formed by injection moulding) which connects the core to the resilient body 114.

The first anchor part 110 is configured to be attached to a first component of vibrating machinery (not shown) in any conventional manner.

The second anchor part 112 comprises a rigid sleeve, e.g. formed from plastic or metal, disposed coaxially with the first anchor part 110 to define an annular space therebetween. The second anchor part 112 may configured to be attached to a second component of vibrating machinery (not shown). The second anchor part 112 may comprise a metal (e.g. extruded aluminium) housing or canister that contains the resilient body 114. The metal housing may have a protective coating (not shown) on its outer surface, e.g. made from vulcanised rubber or the like.

For example, the first component may be an engine or motor and the second component may be the chassis of a vehicle. The bush 100 may be particularly suitable for use between the drive unit, such as the motor, and chassis in an electric vehicle.

In the annular space between the first anchor part 110 and the second anchor part 112, a resilient body 114 is provided. The resilient body 114 may be formed from a resiliently deformable material such as rubber. For example, the resilient material may be rubber having a hardness of between 45 and 50 as measured with a Shore A durometer. The resilient body 114 could either have voids/passageways or be solid rubber, as required by the desired stiffness characteristic.

In some examples, the resilient body 114 may be bonded to one or both of the first anchor part 110 and the second anchor part 112. For example, the resilient body 114 may be bonded to the first anchor part 110 and this arrangement may be push-fitted into the second anchor part 112 to increase durability. The increase in durability comes from pre-compressing the rubber to remove residual stresses caused by the rubber shrinking during moulding.

The resilient body 114 extends radially between an outer surface of the first anchor part 110 and an inner surface of the second anchor part 112. The second anchor part 112 may comprise an upper ring element 116 and a lower ring element 118 which are affixed to respective upper and lower lobes 115, 117 of the resilient body 114. The upper ring element 116 and the lower ring element 118 may be formed from a suitably rigid plastic material, e.g. by injection moulding. The material may be selected to provide a robust connection to the material of the resilient deformable material.

The second anchor part 112 may include a radially inwardly protruding portion 120 disposed between the upper ring element 116 and the lower ring element 118. The radially inwardly protruding portion 120 may be arranged to limit the radial travel of a snub portion 122 on the resilient body. In this example, the snub portion 122 is a circumferential rib that protrudes outwardly from an outer surface of the first anchor part 110. The radially inwardly protruding portion 120 may be integrally formed with the second anchor part 112 or may be a separate moulded component, e.g. injection moulded, that is retained by the second anchor part 112. The upper ring element 116 and lower ring element may be secured to the radially inwardly protruding portion 120, e.g. around axial ends thereof.

Figure 2:
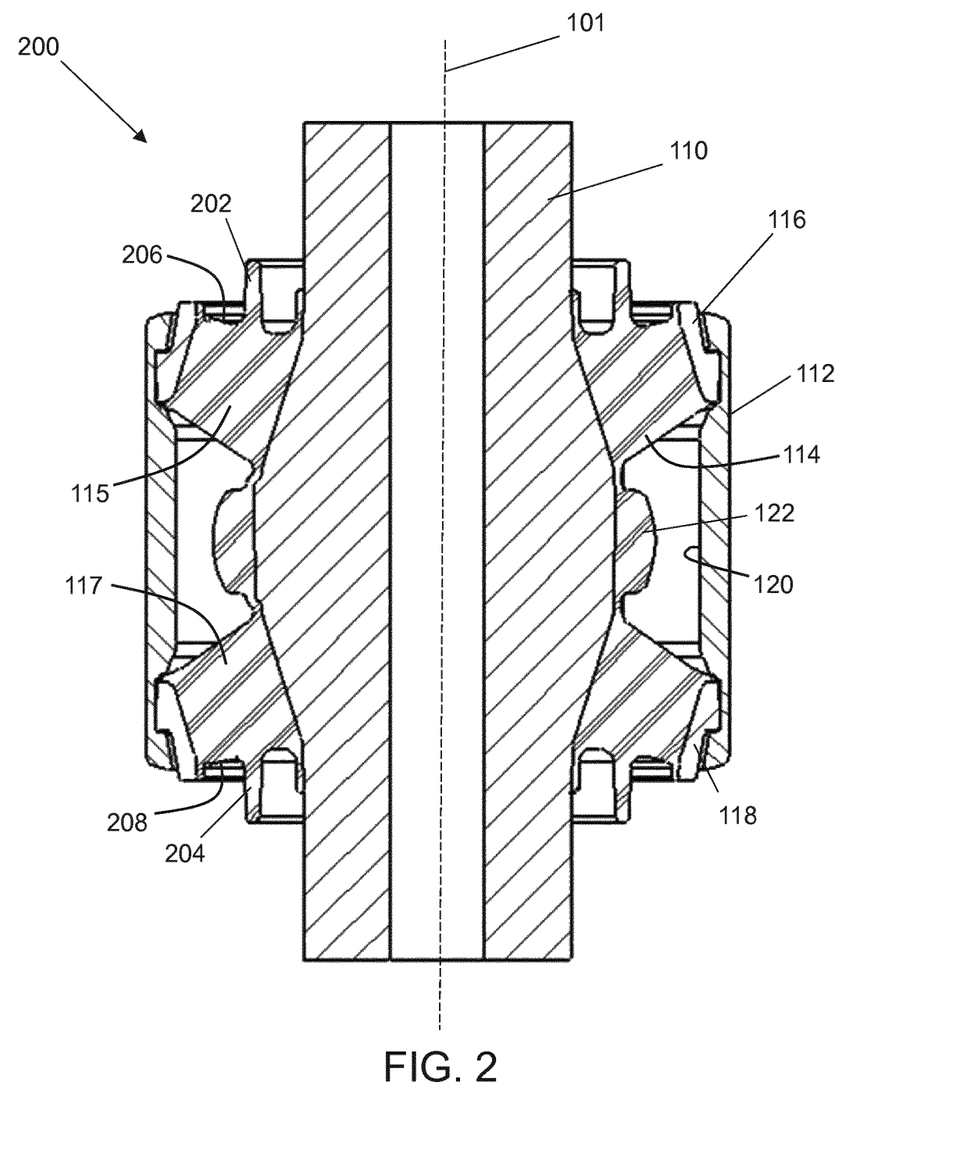
FIG. 2 is a cross-sectional side view of a bush that is an embodiment of the present invention.

FIG. 2 is a cross-sectional view of a bush 200 that is an embodiment of the invention. Features in common with the bush 100 of FIG. 1 are given the same reference number and are not described again.

The bush 200 of the invention differs from the bush 100 of FIG. 1 in the provision of tuning elements 202, 204 operably connected to the resilient body 114. In this example, the tuning elements 202, 204 are coupled respectively to an upper surface 206 of the upper lobe 115 of the resilient body and a lower surface 208 of the lower lobe 117 of the resilient body. In principle the tuning elements 202, 204 can be coupled to other regions of the resilient body 114, but these locations may be advantageous because they do not interfere with operation of the movement limiter formed by the snub portion 122 and radially inwardly projecting surface 120.

It may be desirable to provide a tuning elements 202, 204 on both the upper surface 206 and the lower surface 208 as shown in FIG. 2. Where the bush is symmetrical (i.e. the upper and lower lobes 115, 117 are the same), the tuning elements 202, 204 may have the same configuration. More generally, any number of tuning elements may be provided on the upper and lower surfaces 206, 208 in order to provide a smooth dynamic stiffness response across the operational vibration frequency range.

In this example, the tuning elements 202, 204 each comprise an extension of the resilient body 114 in the form of an axially extending annular wall or wing that encircles (e.g. is coaxial with) the longitudinal axis 101. The tuning elements 202, 204 may be integrally formed with the resilient body 114, i.e. may be formed of the same resilient deformable material. However, in other embodiments, the tuning elements may be formed separately and bonded or otherwise secured to the resilient body 114.

In the embodiment of FIG. 2, each tuning element 202, 204 comprises a single upstanding annular wing that extends in the axial direction. In other example, each tuning element may comprise a plurality of spaced annular wings, and/or each wing may extend at an angle relative to the longitudinal axis. Each wing may have a radial thickness that is much less than the radial extent (e.g. width) of the resilient body. This has the effect of controlling the position on the resilient body where the additional mass of the tuning element is effective.

The tuning elements 202, 204 operate as mass dampers for the purpose of damping resonances of the bush, so that the bush exhibits a low dynamic stiffness across a desired vibration frequency range. In this case, it has been found that the tuning elements 202, 204 are particular useful in damping resonance across a vibration frequency range associated with the normal operation of an electric motor, e.g. in an electric or hybrid motor vehicle. This vibration frequency range may be higher than that associated with conventional internal combustion engines. The desired vibration frequency range in which the tuning elements 202, 204 cause damping may be 500-2500 Hz, for example.

In use, the resilient body 114 and the tuning elements 202, 204 operate together to isolate vibrations between the first anchor part 110 and the second anchor part 112. In this way, a first component may be isolated from vibrations of a second component, and vice versa, by interconnecting the two components using the bush 200. As the two components affixed to the bush 200 vibrate relative to each other, the resilient body 114 and the tuning elements 202, 204 deform to isolate the vibration. The resilient body 114 may have one or more eigenmodes at which the dynamic stiffness of the resilient material increases, tending to reduce vibrational isolation between the two interconnected components. As explained above, the provision of the tuning elements 202, 204 serves to reduce these stiffness increases at the eigenmodes, ensuring that two components are isolated from relative vibration at all operating frequencies.

Properties of the resilient body 114 and tuning elements 202, 204 may be selected to isolate vibrations across the operating frequency range of the two components. In particular, the properties and dimensions of the tuning elements 202, 204 may be selected so as to isolate the first anchor part 110 and second anchor part 112 from dynamic stiffness increases associated with eigenmodes of the resilient body 114. The shape, material and configuration of the tuning elements 202, 204 may be selected so that the bush exhibits a desirable dynamic stiffness characteristic, as discussed below. For example, the tuning elements 202, 204 116*b* may be manufactured from a resilient material having a desired stiffness and/or hardness, or any other material property. The tuning elements 202, 204 may also be tuned to ensure that they isolate dynamic stiffness increases at the eigenmodes of the resilient body 114.

Figure 3:
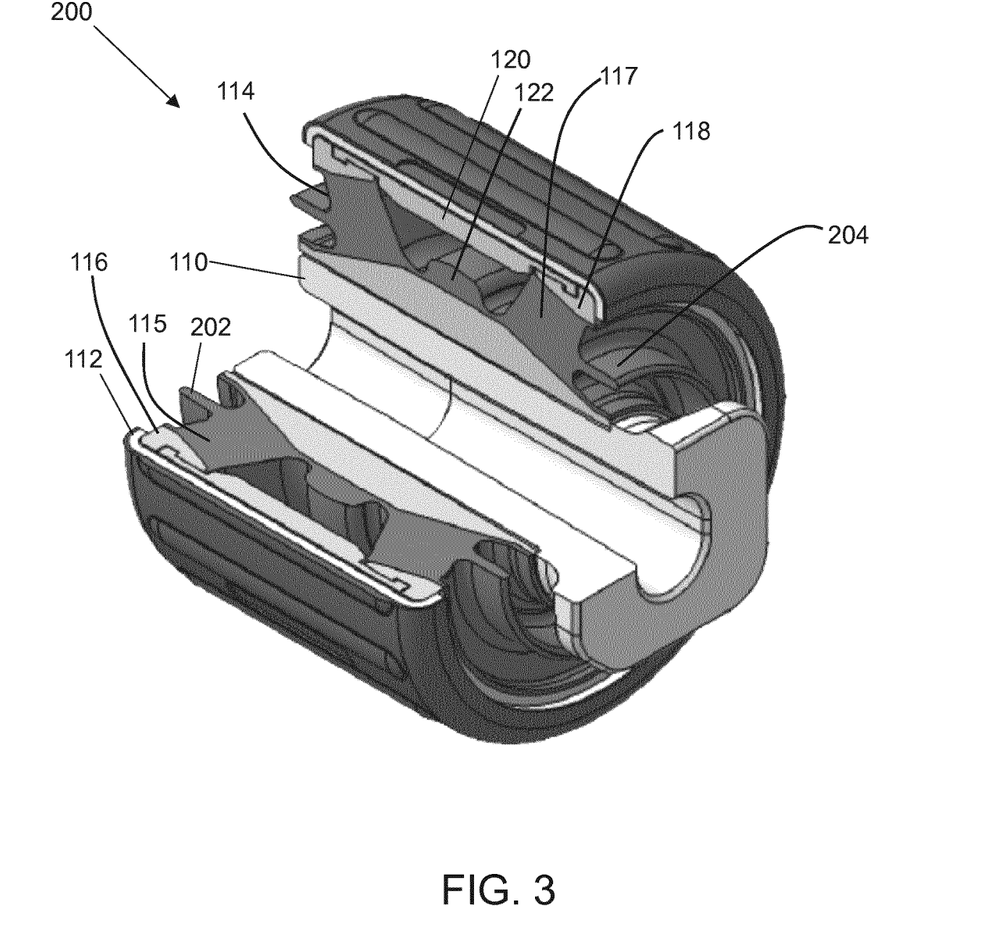
FIG. 3 is a cut-away perspective view of the bush of FIG. 2.

FIG. 3 is a cut-away perspective view of the bush 200 provided to show the three-dimensional nature of the features in more detail. Features discussed above are given the same reference number and are not discussed again.

Figure 4:
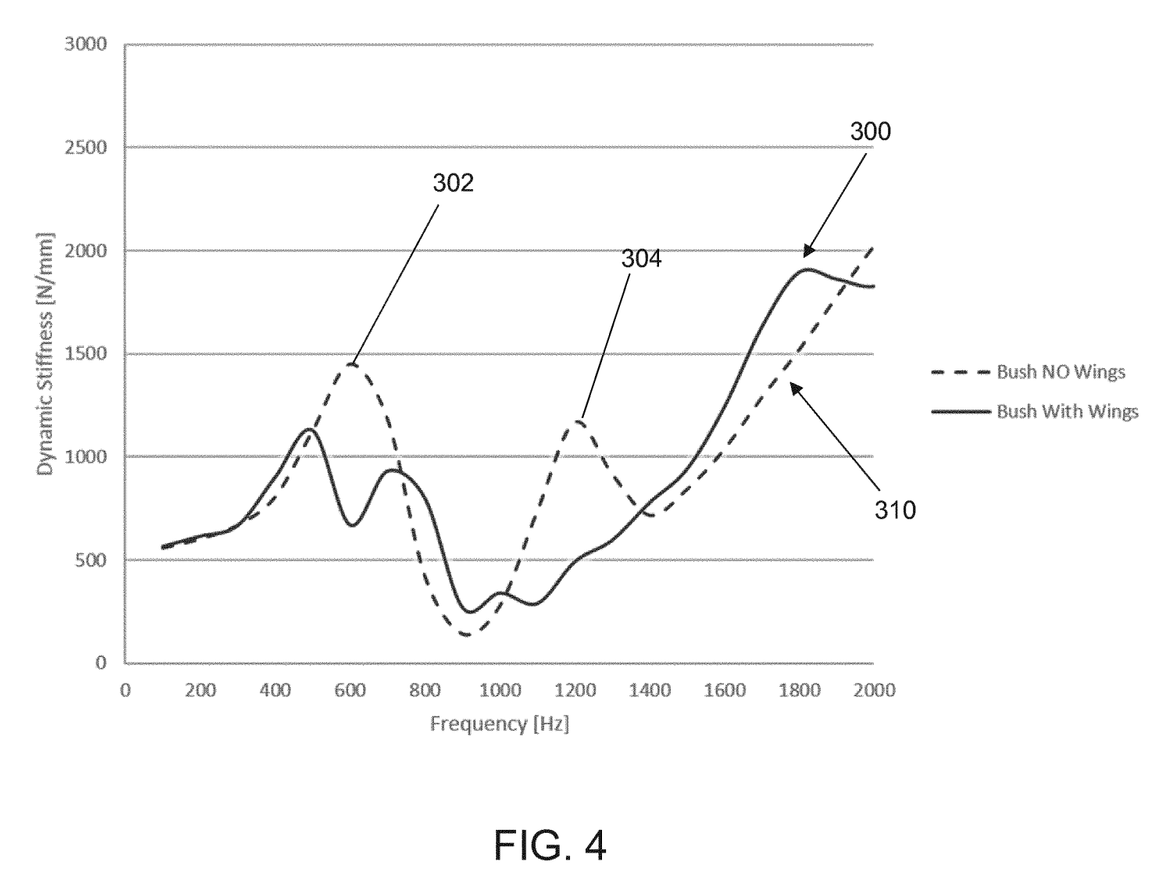
FIG. 4 is a graph showing dynamic stiffness against frequency for the conventional bush of FIG. 1 and the bush of FIG. 2.

FIG. 4 shows a graph of dynamic stiffness against frequency for a known bush such as the bush 100 shown in FIG. 1 and a bush according to the present invention, such as the bush 200 shown in FIG. 2.

As can be seen in FIG. 4, a dynamic stiffness characteristic 300 for a known bush exhibits stiffness peaks 302, 304 corresponding to eigenmodes at approximately 600 and 1200 Hz. These peaks represent reduced vibrational isolation between two components interconnected by the bush. For example, where the bush is used to mount an engine or motor to the chassis of a vehicle, this may result in unwanted noise. It is therefore desirable to reduce or eliminate the stiffness increases in the bush at these frequencies.

A bush such as that shown in FIG. 2 may have a dynamic stiffness characteristic 310 in which dynamic stiffness peaks at approximately 600 and 1200 Hz are reduced or eliminated. Eigenmodes of the bush are dependent on the size or material of the resilient body 114. Therefore, by suitable configuration of the tuning element 202, 204, the damping effect at these frequencies may be adjusted, and the frequencies of the damping effect may be 'tuned' to more closely match the eigenmodes of the resilient body 114. By providing the tuning element 202, 204 in this way, it can be seen in FIG. 4 that the dynamic stiffness peaks are much reduced, meaning that two components which are connected by bush are isolated from relative vibration across the desired range of operating frequencies.

Figure 5A:
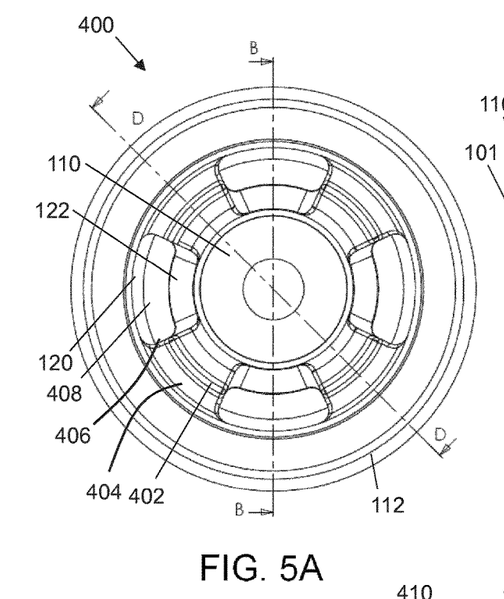
FIG. 5A is a plan view of a bush that is another embodiment of the invention.
Figure 5B:
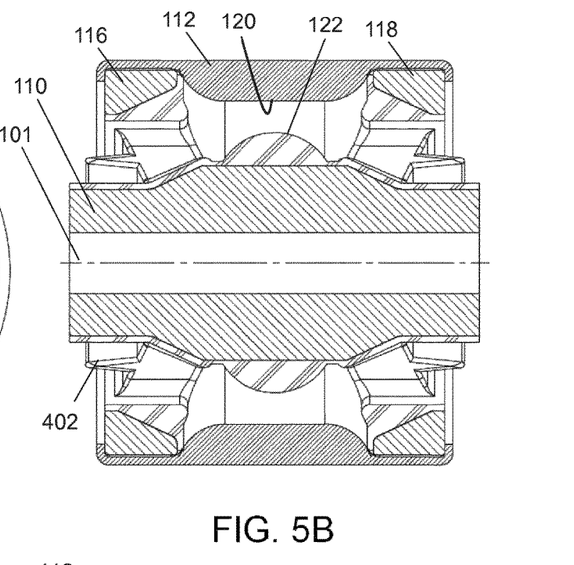
FIG. 5B is a longitudinal cross-sectional view of the bush of FIG. 5A taken along the line B-B.
Figure 5C:
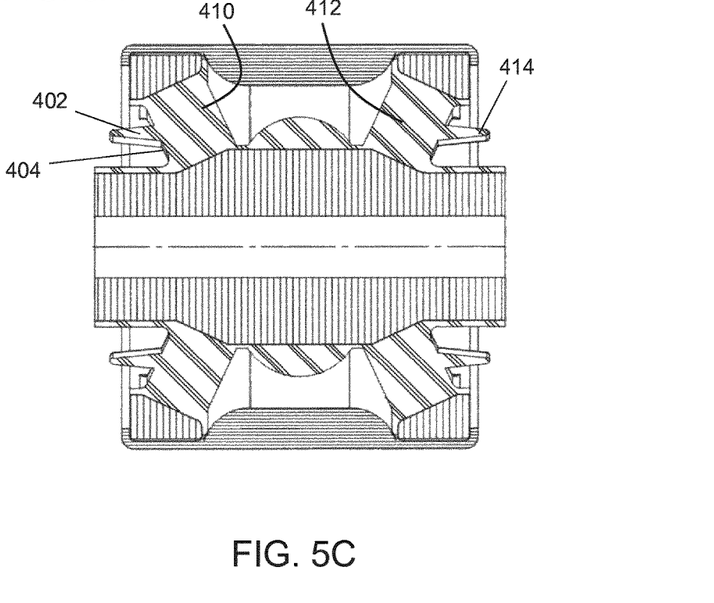
FIG. 5C is a longitudinal cross-sectional view of the bush of FIG. 5A taken along the line D-D.

FIGS. 5A, 5B and 5C show various views of a bush 400 that is another embodiment of the invention. Features in common with the bushes 100, 200 shown in FIGS. 1 and 2 are given the same reference number and are not described again.

FIG. 5A shows a top view of the bush 400. Similarly to the bush 200 shown in FIG. 2, the bush 400 includes a tuning element 402 coupled to an upper surface of resilient body 404. In this example, the resilient body 404 is formed with a plurality of axial passageways 408 therethrough, such that it comprises a plurality of radial arms that extend between the anchor parts 110, 112. The passageways 408 are disposed regularly around the axis 101 of the bush. In this example there are four passageways 408, but the invention need not be limited to this number of configuration.

Each passageway 408 is defined by an aperture 406 through in the upper surface of the resilient body 404. The passageway 408 preferably extends completely through the resilient body in the axial direction. In FIG. 5A the snub portion 122 and radially inwardly projecting surface 120 within the bush are visible when looking down through the aperture 406. However, in other examples the passageway 508 may be closed, e.g. at the lower surface of the upper lobe 410 and/or the upper surface of the lower lobe 412. In such an example, the passageway 408 may resemble a pocket or blind channel formed in the respective lobe of the resilient body 404. The passageway 408 may be closed by a web or skin of resilient material that spans across the passageway 408 within the resilient body 404. The web may be integrally formed with the resilient body 404.

The passageways 408 provide gaps in the circumferential extent of the resilient body 404. Such gaps may improve the performance of the bush for dampening high frequency vibrations between the anchor parts 110, 112 compared with a configuration having an unbroken circumferential resilient body.

As shown in FIGS. 5B and 5C, the resilient body 404 in the bush 400 has both an upper lobe 410 and a lower lobe 412. Passageways 408 are provided in both the upper lobe 410 and the lower lobe 412 in an aligned manner, i.e. in which each passageway in the upper lobe has a corresponding passageways in the lower lobe aligned therewith in an axial direction.

In the bush 400 shown in FIGS. 5A, 5B and 5C, a tuning element 402 is coupled to each portion of the resilient body 404 that extends between adjacent passageways 408. Similarly to the bush 200 shown in FIG. 2, each tuning element 402 is an upstanding wing that extends in the axial direction. Corresponding tuning elements 414 are provided on the lower surface of the lower lobe 412, such that the bush is symmetrical about a lateral mid plane.

Figure 6A:
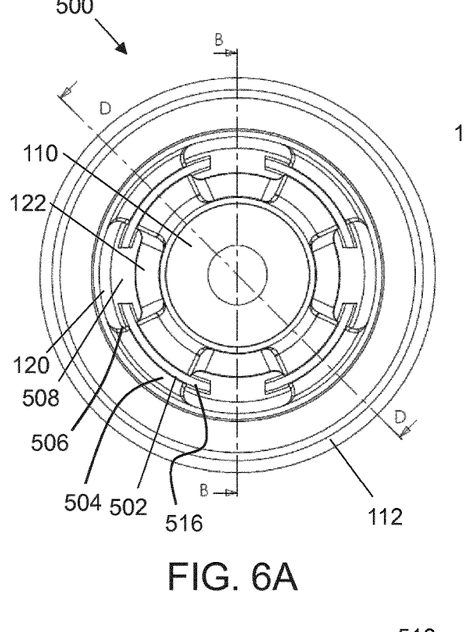
FIG. 6A is a plan view of a bush that is yet another embodiment of the invention.
Figure 6B:
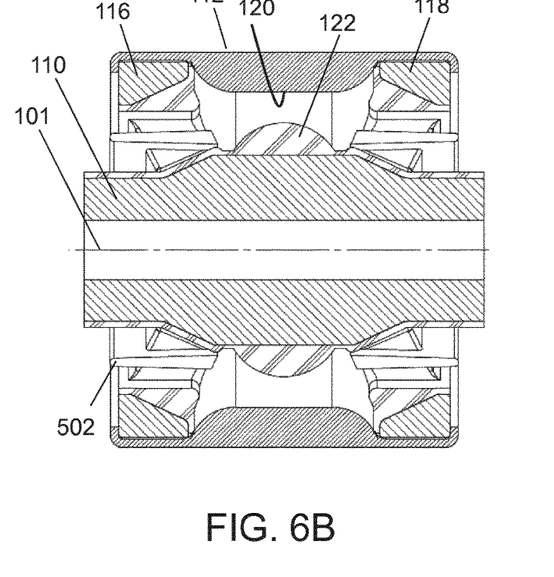
FIG. 6B is a longitudinal cross-sectional view of the bush of FIG. 6A taken along the line B-B.
Figure 6C:
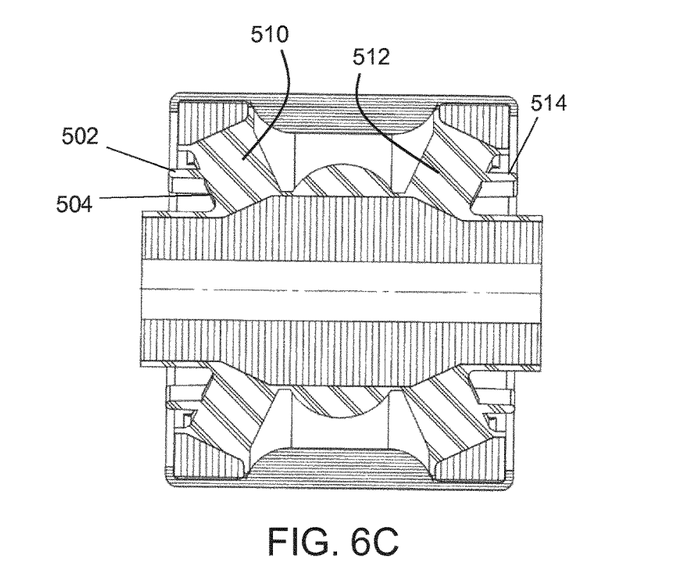
FIG. 6C is a longitudinal cross-sectional view of the bush of FIG. 6A taken along the line D-D.

FIGS. 6A, 6B and 6C show various views of a bush 500 that is another embodiment of the invention. Features in common with the bushes 100, 200 shown in FIGS. 1 and 2 are given the same reference number and are not described again.

FIG. 6A shows a top view of the bush 500. Similarly to the bush 400 shown in FIGS. 5A, 5B and 5C, the bush 500 has a resilient body 504 that is formed with a plurality of axial passageways 508 therethrough. The passageways 508 are disposed regularly around the axis 101 of the bush. In this example there are four passageways 508, but the invention need not be limited to this number of configuration.

Each passageway 508 is defined by an aperture 506 through in the upper surface of the resilient body 504. The passageway 508 preferably extends completely through the resilient body in the axial direction. In FIG. 6A the snub portion 122 and radially inwardly projecting surface 120 within the bush are visible when looking down through the aperture 506. However, in other examples the passageway 508 may be closed, e.g. at the lower surface of the upper lobe 510 and/or the upper surface of the lower lobe 512, as discussed above.

The passageways 508 provide gaps in the circumferential extent of the resilient body 504. Such gaps may improve the performance of the bush for dampening high frequency vibrations between the anchor parts 110, 112 compared with a configuration having an unbroken circumferential resilient body.

As shown in FIGS. 6B and 6C, the resilient body 504 in the bush 500 has both an upper lobe 510 and a lower lobe 512. Passageways 508 are provided in both the upper lobe 510 and the lower lobe 512 in an aligned manner, i.e. in which each passageway in the upper lobe has a corresponding passageways in the lower lobe aligned therewith in an axial direction.

In the bush 500 shown in FIGS. 6A, 6B and 6C, a tuning element 502 is coupled to each portion of the resilient body 504 that extends between adjacent passageways 508. Similarly to the bush 200 shown in FIG. 2, each tuning element 502 is an upstanding wing that extends in the axial direction. Corresponding tuning elements 514 are provided on the lower surface of the lower lobe 512, such that the bush is symmetrical about a lateral mid plane.

Unlike the bush 400, however, where the tuning element 402, 414 are confined to the surface of the resilient body 404, in the bush 500, each tuning element 502 has a portion 516 that extends over the boundary of the aperture 506 to protrude into the passageway 508. The extent and direction in which the portion 516 protrudes into the passageway 508 may be selected to assisting tuning of the bush's performance. FIG. 6B shows that the portion 516 protrudes along the whole length of the respective lobe of the resilient body, but this need not be essential.

Figure 7A:
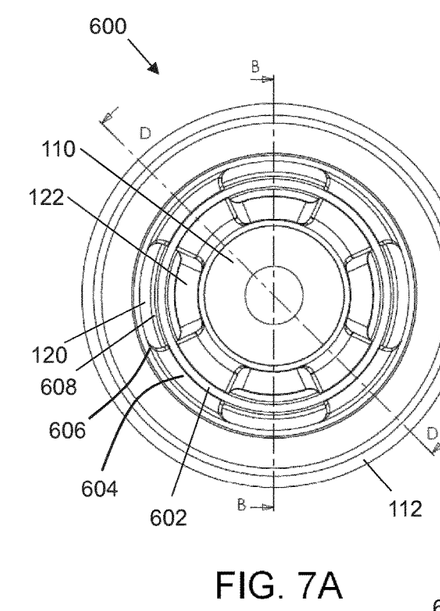
FIG. 7A is a plan view of a bush that is yet another embodiment of the invention.
Figure 7B:
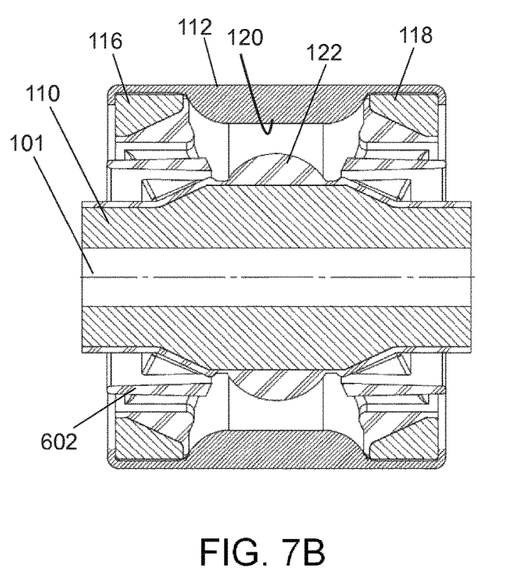
FIG. 7B is a longitudinal cross-sectional view of the bush of FIG. 7A taken along the line B-B.
Figure 7C:
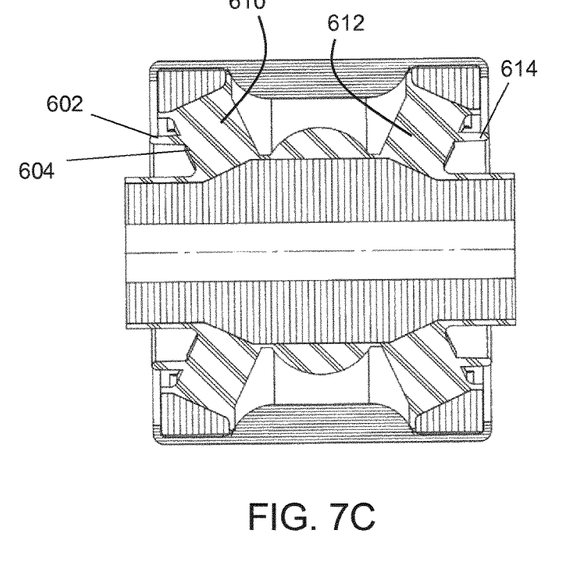
FIG. 7C is a longitudinal cross-sectional view of the bush of FIG. 7A taken along the line D-D.

FIGS. 7A, 7B and 7C show various views of a bush 600 that is another embodiment of the invention. Features in common with the bushes 100, 200 shown in FIGS. 1 and 2 are given the same reference number and are not described again.

FIG. 7A shows a top view of the bush 600. Similarly to the bush 400 shown in FIGS. 5A, 5B and 5C, the bush 600 has a resilient body 604 that is formed with a plurality of axial passageways 608 therethrough. The passageways 608 are disposed regularly around the axis 101 of the bush. In this example there are four passageways 608, but the invention need not be limited to this number of configuration.

Each passageway 608 is defined by an aperture 606 through in the upper surface of the resilient body 604. The passageway 608 preferably extends completely through the resilient body in the axial direction. In FIG. 7A the snub portion 122 and radially inwardly projecting surface 120 within the bush are visible when looking down through the aperture 606. However, in other examples the passageway 608 may be closed, e.g. at the lower surface of the upper lobe 610 and/or the upper surface of the lower lobe 612, as discussed above.

The passageways 608 provide gaps in the circumferential extent of the resilient body 604. Such gaps may improve the performance of the bush for dampening high frequency vibrations between the anchor parts 110, 112 compared with a configuration having an unbroken circumferential resilient body.

As shown in FIGS. 7B and 7C, the resilient body 604 in the bush 600 has both an upper lobe 610 and a lower lobe 612. Passageways 608 are provided in both the upper lobe 610 and the lower lobe 612 in an aligned manner, i.e. in which each passageway in the upper lobe has a corresponding passageways in the lower lobe aligned therewith in an axial direction.

In the bush 600 shown in FIGS. 7A, 7B and 7C, a tuning element 602 is coupled to a top surface of the upper lobe 610 of the resilient body 604. However, unlike the arrangement discussed above in which a separate tuning element was provided on each portion of the resilient body between the passageways, in this embodiment the tuning element 602 is a continuous entity that encircles the axis 101. The tuning element 602 is coupled to each portion of the resilient body 604 that extends between adjacent passageways 608. But rather than terminating at or in the passageways 608, the tuning element 602 bridges between opposite sides of passageway 608. FIG. 7B shows that the bridging portion (i.e. the part of the tuning element within the passageways) extends down the whole axial length of the respective lobe of the resilient body. However, this arrangement need not be essential. For example, the bridging portion may pass only over the top of the passageway 608.

As shown in FIG. 7A, the tuning element 602 is in the form of a circle centred on the axis 101. However, other geometries (e.g. elliptical or irregular) may be used. Similarly to the bush 200 shown in FIG. 2, the tuning element 602 is an upstanding annular wing that extends in the axial direction. A corresponding tuning elements 614 is provided on the lower surface of the lower lobe 612, such that the bush is symmetrical about a lateral mid plane.

The inventors have found that the combination of passageways through the resilient body in conjunction with a continuous wing or blade shaped tuning element that connects the "legs" of the resilient body that are separated by the passageways leads to a bush with improved high frequency performance, especially in a frequency range from 500-2500 Hz. Without wishing to be bound by theory, it is thought that the continuous tuning element has different vibrational modes compared with separate tuning structure that ensures that the overall system does not exhibit a vibrational eigenmode in the high frequency range.

The invention claimed is:

1. A bush for isolating vibrations, the bush comprising:
a first anchor part that defines a longitudinal axis;
a second anchor part spaced from the first anchor part;
a resilient body extending between the first anchor part and the second anchor part and operably engaged with the first anchor part and the second anchor part to isolate vibrations therebetween, the resilient body comprising a plurality of radial arms spaced apart around the longitudinal axis, wherein each pair of adjacent arms is separated by a longitudinally extending passageway; and
a tuning element formed with and extending from an outer surface of the resilient body,
wherein the tuning element comprises an upstanding wall bridging across each longitudinally extending passageway, and
wherein the tuning element is configured to reduce dynamic stiffness increases associated with eigenmodes of the resilient body within a predetermined operational vibration frequency range.

2. A bush according to claim 1, wherein the upstanding wall extends along a circumferential path that is coaxial with the longitudinal axis.

3. A bush according to claim 1, wherein the second anchor part is disposed coaxially with respect to the first anchor part, and the resilient body extends radially between the first anchor part and the second anchor part.

4. A bush according to claim 3, wherein the upstanding wall is on an axial end surface of the resilient body.

5. A bush according to claim 4, wherein the upstanding wall is an annular wall having a height extending in an axial direction with respect to the longitudinal axis.

6. A bush according to claim 5, wherein the upstanding wall has a maximum radial thickness that is less than half of a radial length of the axial end surface.

7. A bush according to claim 1, wherein the upstanding wall encircles the longitudinal axis.

8. A bush according to claim 3, wherein the tuning element comprising an upper annular wall protruding from an upper axial end surface of the resilient body, and a lower annular wall protruding from a lower axial end surface of the resilient body.

9. A bush according to claim 8, wherein the resilient body comprising an upper lobe that extends radially between the first anchor part and second anchor part and a lower lobe that extends radially between the first anchor part and second anchor part, wherein the upper lobe and lower lobe are separated by an annular space, and wherein the upper axial end surface is on the upper lobe and the lower axial end surface is on the lower lobe.

10. A bush according to claim 9, wherein the resilient body comprises a snub portion in the annular space, the snub portion being configured to limit radial travel of the first anchor part relative to the second anchor part.

11. A bush according to claim 3, wherein the first anchor part is a rod extending along the longitudinal axis, and wherein the second anchor part is a sleeve surrounding the rod.

12. A bush according to claim 11, wherein the resilient body extends radially between an outer surface of the rod and an inner surface of the sleeve.

13. A bush according to claim 1, wherein the resilient body is formed by injection moulding.

14. A bush according to claim 1, wherein the resilient body is formed from a resilient material that is a natural rubber.

15. A bush according to claim 1, wherein the first anchor part is connectable to a first machine component and the second anchor part is connectable to a second machine component, whereby the bush is operable to isolate vibrations between the first machine component and second machine component.

16. A bush according to claim 15, wherein the first machine component is an electric motor.

17. A bush according to claim 15, wherein the first machine component and second machine component are an engine and a chassis, respectively, of a vehicle.

18. A bush according to claim 1 wherein the tuning element is formed of a same material as the resilient body.

* * * * *